US008237570B1

(12) United States Patent
Parekh

(10) Patent No.: US 8,237,570 B1
(45) Date of Patent: Aug. 7, 2012

(54) INTEGRATED, HIGH EFFICIENCY RFID UHF READER/ANTENNA

(75) Inventor: Apurva Jayantilal Parekh, Maharashtra (IN)

(73) Assignee: Essen Energy Conversion Devices Pvt. Ltd., Bombay (IN)

( * ) Notice: Subject to any disclaimer, the term of this patent is extended or adjusted under 35 U.S.C. 154(b) by 543 days.

(21) Appl. No.: 12/153,216

(22) Filed: May 15, 2008

Related U.S. Application Data

(60) Provisional application No. 60/929,118, filed on Jun. 13, 2007.

(51) Int. Cl.
G08B 13/14 (2006.01)

(52) U.S. Cl. ............ 340/572.7; 340/693.1; 340/693.4; 340/333

(58) Field of Classification Search .... 340/572.1–572.9, 340/333, 693.4, 693.1; 343/700 R
See application file for complete search history.

(56) References Cited

U.S. PATENT DOCUMENTS

| 465,971 | A | 12/1891 | Edison |
| 5,621,199 | A | 4/1997 | Calari |
| 6,069,564 | A | 5/2000 | Hatano |
| 6,445,297 | B1 | 9/2002 | Nicholson |
| 6,640,308 | B1* | 10/2003 | Keyghobad et al. .......... 713/300 |
| 6,720,930 | B2 | 4/2004 | Johnson |
| 6,903,656 | B1* | 6/2005 | Lee ............................ 340/572.1 |
| 7,672,591 | B2* | 3/2010 | Soto et al. ........................ 398/72 |
| 2006/0022815 | A1* | 2/2006 | Fischer et al. ................ 340/505 |
| 2006/0158333 | A1* | 7/2006 | Garber et al. .............. 340/572.2 |
| 2006/0189440 | A1* | 8/2006 | Gravagne ......................... 482/8 |
| 2007/0176748 | A1 | 8/2007 | Salamitou |
| 2008/0013243 | A1* | 1/2008 | Gammel et al. .............. 361/118 |
| 2008/0062586 | A1* | 3/2008 | Apfel .............................. 361/18 |
| 2008/0069736 | A1* | 3/2008 | Mingerink et al. .......... 422/102 |
| 2008/0070569 | A1* | 3/2008 | Shelley et al. ............. 455/426.2 |
| 2008/0129118 | A1* | 6/2008 | Diab ............................... 307/35 |
| 2008/0159744 | A1* | 7/2008 | Soto et al. .................... 398/115 |
| 2008/0172564 | A1* | 7/2008 | Diab et al. .................... 713/300 |
| 2008/0218330 | A1* | 9/2008 | Biles et al. .................... 340/506 |
| 2008/0224869 | A1* | 9/2008 | Kaplan ....................... 340/572.1 |
| 2010/0060452 | A1* | 3/2010 | Schuster et al. ........... 340/572.1 |
| 2010/0134295 | A1* | 6/2010 | Lax et al. .................... 340/572.8 |
| 2010/0150556 | A1* | 6/2010 | Soto et al. ....................... 398/66 |
| 2010/0259364 | A1* | 10/2010 | Man ............................. 340/10.1 |

FOREIGN PATENT DOCUMENTS

CN 1858772 A 11/2006

\* cited by examiner

*Primary Examiner* — Hoi Lau

(57) ABSTRACT

Invention discloses a highly efficient integrated physical Reader with dual circular bi-static antenna device comprising an integral DC to DC converter 3, built in to supply power to the reader, wherein desired power, 48V is supplied from the switch 7, to the magnetic transformer 1, an integral RJ 45 female connecter 2, to separate the power; the separated power from the magnetic transformer 1, is fed in to the DC to DC converter 3, which steps it down around 8 volts and then fed to a regulator, providing +5 V as output; which is further fed to the reader to drive the dual circular bi-static antenna to receive or transmit the signals; wherein the said system is assembled within the Antenna enclosure, which eliminates severe distance limitation and deterioration in signal strength imposed by the RF cable.

10 Claims, 2 Drawing Sheets

DETAILED SCHEMATIC DIAGRAM

DETAILED SCHEMATIC DIAGRAM

INTEGRATED, HIGH EFFICIENCY RFID UHF READER/ANTENNA

TECHNICAL FIELD

This invention relates to a highly efficient Radio Frequency (RF) Transmitter/Receiver technology useful for radio frequency identification. More particularly it describes a highly efficient integrated single physical Reader, integrated with Dual Circular Bi-Static Antenna devices and within the antennae enclosure, an integral DC to DC converter built in to supply power to the Reader, alleviating the need for wall socket power provision.

BACKGROUND AND PRIOR ART

Radio Frequency Identification (RFID) is an automatic identification method, relying on storing and remotely retrieving data using devices called RFID Readers and Tags. Both these devices have to tune to the same frequency to communicate. These systems use many different frequencies for identification. They use LF—Low-frequency, also called NF—near frequency, High-frequency and currently becoming most popular, the UHF—Ultra-high-frequency.

Presently, in the field of Radio Frequency or so called the radio frequency Identification (RFID) technology; it has various crucial design concepts of antenna and readers, which has a great achievement in the concerned field.

Radio frequency refers to the frequency or rate of oscillation of electromagnetic waves within a specific range that correspond to frequency of altering current electrical signals used to produce and detect radio waves. An antenna is a transducer designed to transmit or receive electromagnetic waves. In other words, antennas convert electromagnetic waves into electrical currents and vice versa. Antennas are used in systems such as radio and television broadcasting, point-to-point radio communication, wireless LAN, radar, and space exploration. Antennas usually work in air or outer space, but can also be operated under water or even through soil and rock at certain frequencies for short distances.

Physically, an antenna is an arrangement of conductors that generate a radiating electromagnetic field in response to an applied alternating voltage and the associated alternating electric current, or can be placed in an electromagnetic field so that the field will induce an alternating current in the antenna and a voltage between its terminals.

Thomas Edison used antennas by 1885. Edison patented his system in U.S. Pat. No. 465,971. Antennas were also used in 1888 by Heinrich Hertz (1857-1894) to prove the existence of electromagnetic waves predicted by the theory of James Clerk Maxwell. Hertz placed the emitter dipole in the focal point of a parabolic reflector.

Moreover the antenna is the conductive element that enables to transmit and receive the radio frequency signals as a single system or one for transmits and another for receive.

Reader is a radio frequency transceiver to transmit radio frequency signals or to receive the encoded signals. The reader typically contains a module or receiver and a control unit with a coupling element. The reader has three main functions like energizing, demodulating and decoding.

U.S. Pat. No. 5,621,199 discloses a stationary compact radio frequency reader unit comprising an radio frequency reader including an radio frequency antenna, a stationary compact reader/write electronics and a interface controller where the said compact reader body portion is adapted to be mounted on standard identification wall mounts. The rotatably adjustable head contains an antenna, can be directed to different direction without moving the compact reader body. In one embodiment the RF reader unit includes a switching power supply located within the reader body portion.

U.S. Pat. No. 6,720,930, 6,069,564, 6,445,297 discloses the different type of antennas like omni directional for remote reader, a multi directional antenna to provide multi-diiectional RF communication to the source and a modular RFID antenna for multi directional RF communication.

CN patent No. 1858772 discloses a radio RF identification system including a reader, a first antenna, a second antenna and an identification controller, in which, the first antenna is connected with the reader generating control signals and transferring them via the first antenna, the second antenna receives the signals and the identification controller is integrated in the circuit elements of a portable electronic device and connected with the second antenna and selects a data signal based on the control signal to send it to the reader via the two antennas, which can avoid the traditional strip or wear of RFID labels to transmit signals even further.

U.S. patent No. 20070176748 discloses a radio frequency communication method to which a communication can be set up between a reader and an radio frequency device at least over a medium distance and over a short distance, the short distance communication being set up using an RFID transponder and an antenna, the medium distance communication being set up by the reader sending a command signal to the transponder in order to switch at least one microcontroller and a transceiver from a passive state to an active state.

In the above stated prior arts it states about the different antenna and reader devices used for the radio frequency identification. It further discloses the separate antenna and reader device can be incorporated within a short distance. These devices further having drawbacks such as limited RF cable length, deterioration of signal strength, due to short cable length and separate mounting of antenna and reader.

Hence there is a need in the art to develop a highly efficient radio frequency identifier which ameliorates the above stated problems, also convenient, user friendly as well as more efficient.

Therefore the current invention aims to provide a potential successor in the field of radio frequency, which comprises the reader electronics, integrated with dual circular bi-static antenna and further an integral DC to DC converter.

OBJECTIVE OF THE INVENTION

The main objective of the invention is to develop an integrated Reader with Dual Circular Bi-Static Antenna useful for radio frequency identification.

Another objective of the present invention is to develop a highly efficient integrated single physical Reader with Dual Circular Bi-Static Antenna and within the antenna enclosure, an integral DC to DC converter built in to supply power to the reader. This alleviates the need for individual wall socket power, a difficult proposition in remote locations.

In yet another objective, the invention provides an integrated Reader with Antenna which requires Single power source of 48V provided by the Network Switch and the same is transmitted over highly cost effective CAT 6 cables, carrying simultaneous 48V Power and Digital Signals compliant with TCP/IP protocol. The Xtenna electronic module separates the two using special MAG Jack module—RJ45 integrated magnetic connector.

In yet another objective, the invention provides an integrated Reader with Antenna which utilizes CAT 6 cables, carrying simultaneous 48V Power and Digital Signals compliant with TCP/IP protocol. This allows Signals to be carried
} a distance of over 330 feet and being Digital in nature are distortion free, maintaining integrity of Data carried, unlike RF cables currently used, which have a limitation of 25 feet, besides being Analogue and notorious for distortion, depending on how noisy the external environment is.

SUMMARY OF THE INVENTION

According to an aspect, the present invention discloses an integrated reader with Dual Circular Bi-Static Antenna technology termed here in below as 'Xtenna'.

Another aspect of the invention discloses to Xtenna, based on transmit/receive high quality signals without having any disruption, bringing in a whole new dimension to its various applications. This innovative approach to RFID has resulted in the development of technology in the form of integrated devices that overcome current RFID shortcomings, extend reach, and improve and optimize operations and therefore extend functionability beyond existing application. This power-extended RF technology eliminates existing limitations by converting analog RF signals to digital at source, using Power-on-Ethernet for transmission. It is easy to mount, sturdy yet light-weight, and can be put to versatile use. Xtenna's unique advantage is its ability to be also used in remote locations and over long distances without signal breakdowns, due to its use of Power-on-Ethernet to transmit both data and 48V DC power over a normal CAT-6 cable. It further eliminates the need for a regular 115/230V power source near the reader or constant battery recharging, as well as overcomes the severe distance limitation imposed by expensive RF cables. All of which results in greater convenience and cost savings during installation as well as operation, at all levels-device integration, data transmission and power supply.

Yet another aspect, of the invention describes an integral DC to DC converter built to supply the required power to the reader offers a method of generating multiple controlled voltages from a single 48V voltage generated through a Network Switch, which functions as a Power source as well as connecting TCP/IP signals to the Edge/Main server collating data, thereby saving space, instead of using multiple wall outlets, which again may not be available in remote locations.

DETAILED DESCRIPTION

Figure 1:
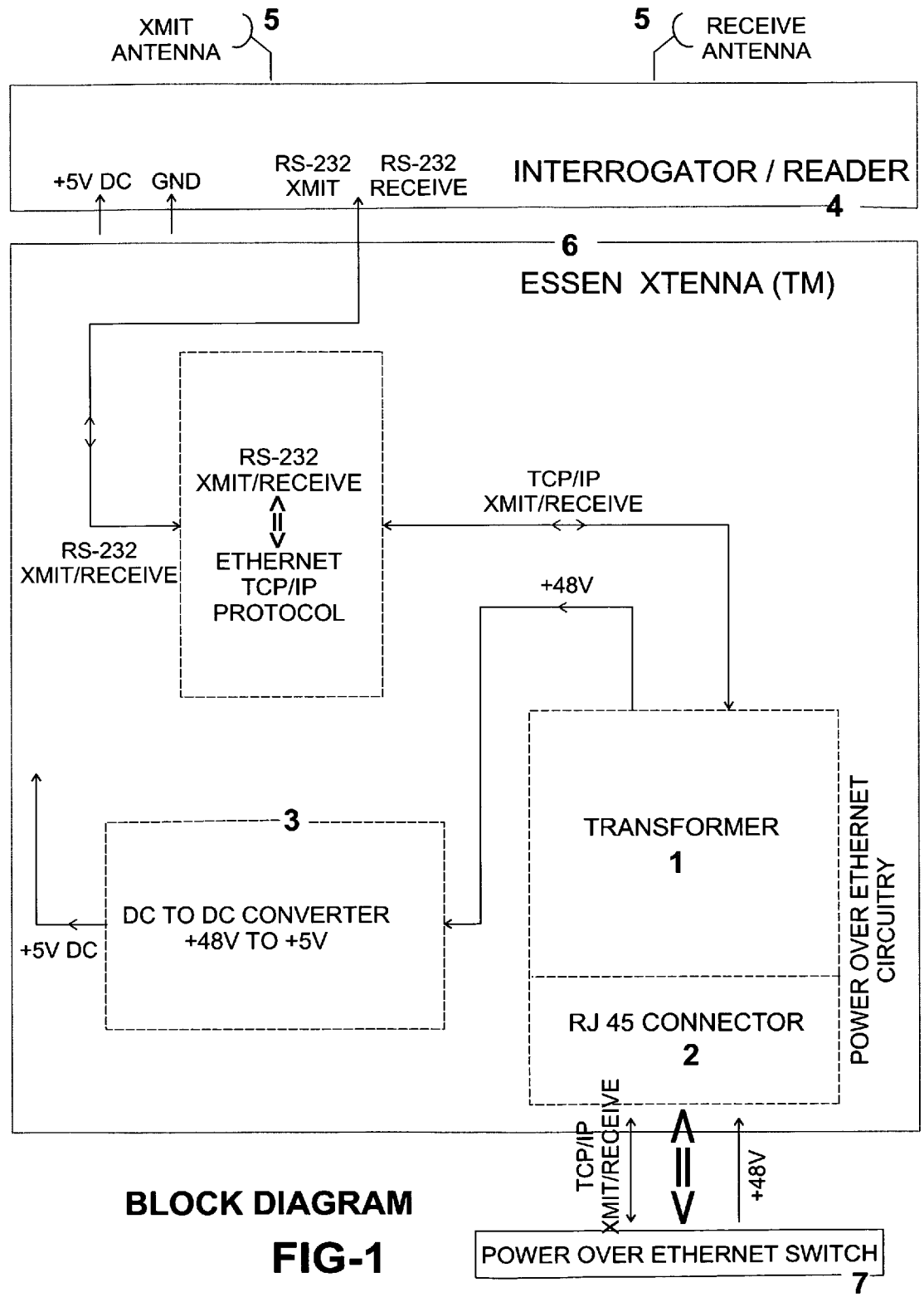
FIG. 1, shows a block diagram for an RFID integrated reader with antenna.

In accordance with the above objects, the invention describes Xtenna, which consist of the reader (4), electronics with the integrated dual circular bi-static antenna (5), within the antenna enclosure and has further an integral DC to DC converter (3), built in supply power to the reader (4), which requires +5 V at 1.8 amperes peak. This power is supplied from the Network switch (7), by designing in a unique magnetic transformer (1) with an integral RJ 45 connector (2). The integrated module separates the power 48V DC from the transmit and receive signal using a unique magnetic transformer (1), with an integral RJ 45 female connector (2).

An embodiment of the present invention is illustrated in accompanying FIG. 1, where a interrogator reader (4), having is connected to dual circular bi-static lobes of the antenna (5) and also Xtenna (6). As indicated in the drawing the distal part of the antenna is connected to an appropriate power supply.

Figure 2:
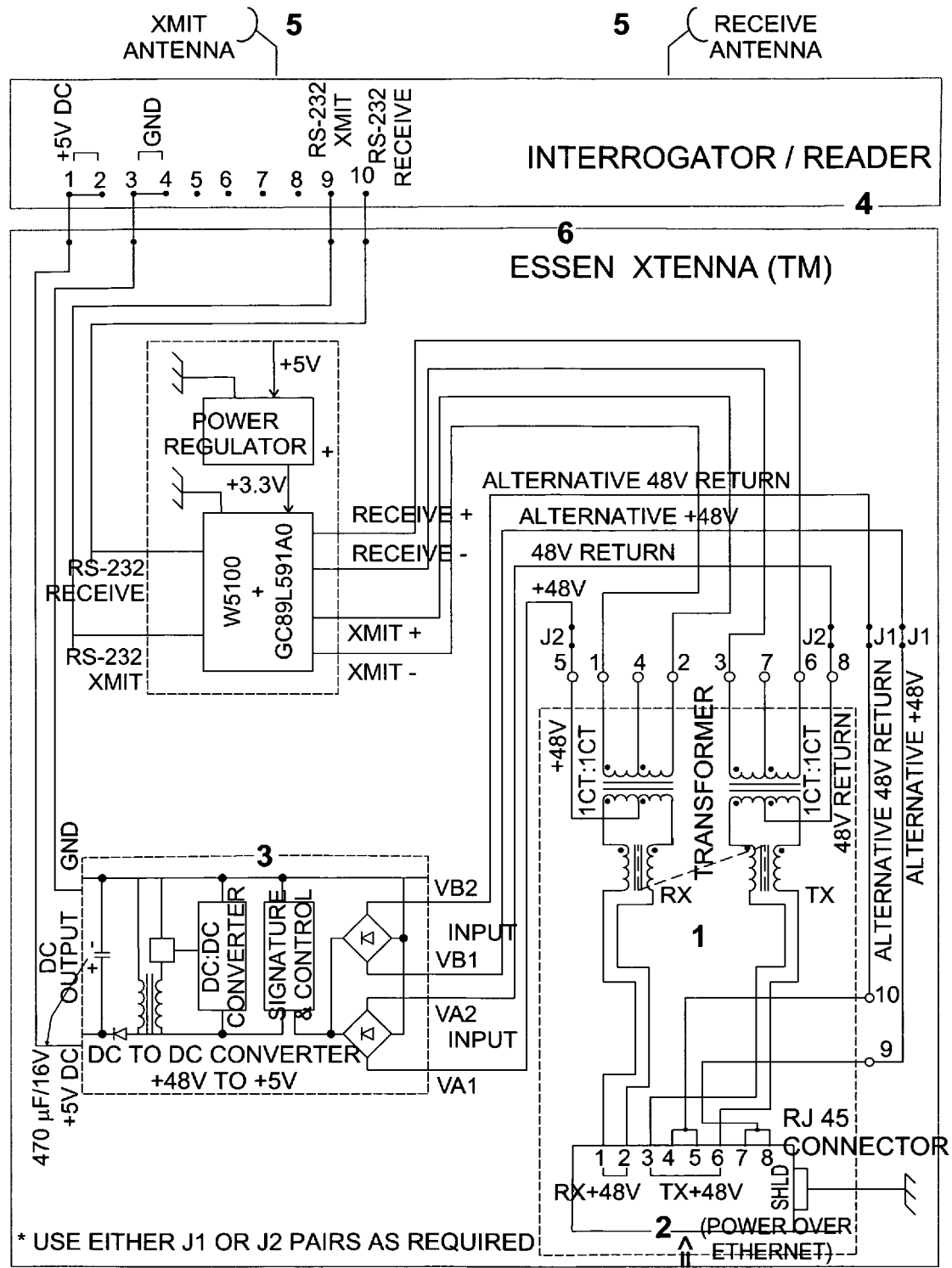
FIG. 2, illustrates a detailed schematic internal circuit diagram for an RFID integrated reader with antenna.

FIG. 2, of the accompanying drawings illustrates the detailed schematic circuit diagrams of the integrated reader with the antenna. The desired power, 48V is supplied from the network switch (7), to the magnetic transformer (1), integrated with the RJ 45 female connector (2). The separated power from the transformer (1), is fed in to the DC to DC converter (3), which steps it down around 8 volts and then fed to a custom built regulator made of various discrete components, providing +5 V as output; which is further fed to the reader (4), is in continuation process, which drives the dual circular antenna's dual bi-static antenna respectively to receive or transmit the signals.

In both drawings FIG. 1, and FIG. 2; the reader and the antenna are a single integrated element which is an innovative approach to RFID.

Once the power is separated from the magnetic transformer 1, it is fed into the DC to DC converter 3 which steps down around 8 volts which is then fed to a custom built regulator made of various discrete components, providing +5 V as output. This is then fed to the reader. The other data signals comprising of transmit and receive, now separated, are fed into the reader 4, which drives the dual circular bi-static Antenna 5, respectively to receive or transmit signals. The transmit and receive signals coming out of the Xtenna, having now been converted to digital by the reader 4.

In another embodiment a highly efficient integrated physical Reader with Antenna device comprises an integral DC to DC converter (3), built in to supply power to the reader (4), wherein the power, 48V, is supplied from network switch (7), to a transformer (1) with an integral RJ 45 female connector (2), to separate the power; the 48V is connected to the RJ 45 connector which acts as a dual function product namely, it acts as a gateway and it also has an inbuilt transformer which separates power (48V) and data and transfers the same to respective areas as required; the separated power from magnetic transformer (1), is fed in to the DC to DC converter (3), which steps it down around 8 volts and then fed to a regulator, providing +5 V as output; which is further fed to the reader (4) to drive dual circular bi-static antenna (5) (comprising of transmit and receive functions, respectively wherein one Antenna would emit RF radiation and the other would receive RF radiation) to transmit or receive signals; wherein the antenna device is assembled within Antenna enclosure (6), useful as radio frequency identifier which eliminates the need for a regular 115/230V power source and also eliminates severe distance limitation and deterioration in signal strength imposed by the RF cable.

In another embodiment, the Xtenna Reader is capable to be driven to 330 ft, which overcomes the severe distance limitation by the RF cables commonly used in the state of art. The Xtenna uses the more valuable cost effective CAT 6 cables instead of the RF cables, which in turn provides the highly reliable signals without any signal deterioration.

Category 6 cables, commonly referred to as CAT 6, is a cable standard for Gigabit Ethernet and other network protocol that is backward compatible with the 5/5e and CAT 3 cable standards. CAT 6 features more stringent specification for crosstalk and system noise. Depending on the length: horizontal, the allowed length of the Cat 6 cable is 100 meters (330 ft).

In an embodiment, the Xtenna uses Power-on-ethernet to transmit both data and 48V DC power over normal CAT-6 cable. Power is generated through a Network Switch, which functions as a Power source as well as connecting TCP/IP signals to the Edge/Main server collating data, thereby saving space, instead of using multiple wall outlets, which again may not be available in remote locations. Thereby eliminating the need of regular 115/230V power source by ensuring that power is sourced from a Power-on-Ethernet switch which pumps in 48 V using an ordinary inexpensive CAT 6 cable.

In an aspect of the invention, the integrated single physical Reader with Antenna device comprises of the high impact polystyrene plastic casing with eight grommets with brass inserts, out of which six are for mounting and two are for go through.

In an another aspect of the invention the said plastic casing comprises of the Ribbing structures, which provides an additional mechanical strength to the integrated Xtenna device.

In an another aspect of the invention the said plastic casing covers a two millimeter thick machine die punched and cut, highly polished, mirror finished, anodized aluminum plate or Inner Plate.

In an another aspect of the invention the said aluminum plate or the Inner Plate comprises stainless steel Allen key fasteners having zero magnetic property to maximize the Radio Frequency intensity without any deterioration.

In an another aspect of the invention the said aluminum plate or the Inner Plate further comprises the DuPont nylon Grommets having excellent insulating properties, which in turn is impervious to the electromagnetic waves.

The Xtenna further comprises acid tin plated PCB (printed circuit board), which help in maximizing radiation field and pattern.

In an another aspect of the invention the said housing cover or the Base Cavity is further coated with heat pressed transparent plastic film to maintain the cosmetic look and make it dust free, scratch proof until final installation.

ADVANTAGE OF THE PRESENT INVENTION

1. This alleviates the problem of having a separate wall power source.
2. There is no deterioration of signal strength, unlike the RF signal.
3. The integrated device can be driven to 330 ft without any perceptible deterioration.
4. Use of CAT 6 cable in place of RF cable, which is cheaper and capable of carrying highly reliable digital signal.
5. No loss of signal, unlike RF cable.
6. Alleviate separate mounting of Antenna and Reader.
7. Highly maintenance free due to Antenna and Reader electronics being integrated.

I claim:

1. A highly efficient integrated physical Reader with Antenna device comprises an integral DC to DC converter (3), built in to supply power to the reader (4), wherein the power, 48V, is supplied from network switch (7), to a magnetic transformer (1) with an integral RJ 45 female connector (2), to separate the power; the separated power from magnetic transformer (1), is fed in to the DC to DC converter (3), which steps it down to 8 volts and then fed to a regulator, providing +5 V as output; which is further fed to the reader (4) to drive antenna's dual circular bi-static lobes (5) to receive or transmit signals; wherein the antenna device is assembled within Antenna enclosure (6), useful as radio frequency reader which eliminates the need for a regular 115/230V power source and also eliminates severe distance limitation and deterioration in signal strength imposed by RF cable.

2. The integrated reader with antenna device as claimed in claim 1, wherein the reader and dual circular bi-static antenna device are integrated form.

3. The integrated reader with dual circular bi-static antenna device as claimed in claim 2, wherein the dual circular bi-static antenna is further integrated with the DC to DC converter.

4. The integrated reader with dual circular bi-static antenna device of claim 2, wherein the dual circular bi-static antenna further comprises of the magnetic transformer.

5. The integrated reader with dual circular bi-static antenna device of claim 4, wherein the magnetic transformer is integrated with RJ 45 female connector.

6. The integrated reader with dual circular bi-static antenna device as claimed in claim 4 or 5, wherein the integrated magnetic transformer with the RJ 45 female connector separates the power 48V from the transmit and receive signal.

7. The integrated reader with dual circular bi-static antenna device as claimed in claim 1 or 3, wherein the DC to DC converter converts the 48 V DC to +5V DC.

8. The integrated reader with dual circular bi-static antenna device as claimed 7, wherein output 5V DC current is fed to the Reader.

9. The integrated reader with dual circular bi-static antenna device as claimed in claim 1, wherein the integrated device further comprises with highly reliable signal carrier CAT 6 cable.

10. The integrated reader with dual circular bi-static antenna device as claimed in claim 9, wherein the CAT 6 Cable is of cost effective and can be extendable up to 330 ft, which is more efficient in comparison to the limited distance and highly environment sensitive RF cables.

* * * * *